United States Patent

Carter et al.

[15] 3,651,324
[45] Mar. 21, 1972

[54] ELECTROMAGNETIC AUTOMATIC APERTURE CONTROL UTILIZING A VELOCITY SENSING WINDING TO PROVIDE ACTIVE FEEDBACK VISCOUS DAMPING

[72] Inventors: Daniel E. Carter; David B. Lederer; David E. Perlman, all of Rochester, N.Y.

[73] Assignee: Eastman Kodak Company, Rochester, N.Y.

[22] Filed: Aug. 24, 1970

[21] Appl. No.: 66,642

Related U.S. Application Data

[63] Continuation of Ser. No. 823,426, May 9, 1969, abandoned.

[52] U.S. Cl. ..................................250/201, 95/64, 250/205, 250/206
[51] Int. Cl. ......................G01j 1/32, G03b 9/02, H01j 39/12
[58] Field of Search ......................250/201, 206, 205; 95/64

[56] References Cited

UNITED STATES PATENTS

| | | | |
|---|---|---|---|
| 2,453,693 | 11/1948 | Armstrong et al. | 250/201 X |
| 2,806,405 | 9/1957 | Amand | 250/201 X |
| 3,349,684 | 10/1967 | Lode | 250/206 X |

*Primary Examiner*—Archie R. Borchelt
*Assistant Examiner*—T. N. Grigsby
*Attorney*—R. W. Hampton and Daniel E. Sragow

[57] ABSTRACT

An automatic exposure control arrangement includes a transducer driven in respectively opposite directions by a differential amplifier which operates in accordance with changes in scene illumination. A light masking member, movable by the transducer, serves to regulate the amount of light reaching both the film and a photocell. A feedback coil is provided at the transducer for controlling the amplifier so as to provide damping.

8 Claims, 2 Drawing Figures

DANIEL E. CARTER
DAVID B. LEDERER
DAVID E. PERLMAN
INVENTORS

BY *Daniel E. Gregan*
*Robert W. Hampton*
ATTORNEYS

3,651,324

ELECTROMAGNETIC AUTOMATIC APERTURE CONTROL UTILIZING A VELOCITY SENSING WINDING TO PROVIDE ACTIVE FEEDBACK VISCOUS DAMPING

This application is a continuation of Ser. No. 823,426 filed May 9, 1969 and now abandoned.

Our invention relates to an automatic exposure control apparatus and more particularly to an automatic exposure control apparatus for use in conjunction with a photographic camera.

BACKGROUND OF THE INVENTION

It is fairly common practice at the present time to equip photographic cameras, both "still" and "movie," with automatic exposure control means which serve to constantly adjust the camera aperture as a function of scene brightness. In this way the desired amount of light is constantly made available to the film regardless of variations in scene or ambient brightness. Such automatic exposure control means have proven invaluable to photographers, amateur and professional alike, since their use contributes in a major way to obtaining good quality pictures, and also as the user is relieved of a precise operation previously required on his part when picture taking.

There have previously been proposed exposure control means wherein a transducer is driven in respectively opposite directions by means of opposed drive coils energized by suitable means such, for example, as a multivibrator of the transistor type. The transducer, in turn, drives light masking means which act to control the amount of light reaching the film as well as the amount of light reaching a photoelectric device included in the multivibrator circuit.

While this and other similar types of automatic exposure control means have provided generally satisfactory results, it is inherent in such arrangements, of course, that the movable elements, for example the transducer magnet and light aperture plate or plates, be extremely sensitive and quickly responsive in their operations and that the inertia of the assembly be kept as small as possible. For these reasons, it has been found that such systems are often inherently subject to objectionable "over correction," that is the system tends to overshoot the equilibrium position and continue to oscillate back and forth.

Accordingly, it is an object of our invention to improve the operation of automatic exposure control means.

A more specific object of our invention is to stabilize the operation of an automatic exposure control arrangement.

A still more specific objection of our invention is to eliminate the "over correction" or overshooting effect in the operation of automatic exposure control arrangements.

SUMMARY OF THE INVENTION

In accordance with a first specific illustrative embodiment of our invention, a transducer is driven in respectively opposite directions by opposed drive coils energized respectively by a differential transistor amplifier of the complementary type. Movement of the transducer magnet causes corresponding movement of aperture regulating means such as an aperture plate; this plate is provided with two similar apertures which control respectively the amount of light reaching the film and the amount of light reaching a photoelectric device which is included in one of the arms of the resistance bridge which controls the operation of the amplifier. In addition to the two drive coils, a feedback coil is provided at the transducer being positioned in inductive relationship to the transducer in such a manner that motion of the transducer will produce an emf in the feedback coil; this emf is fed back into the amplifier circuit in a direction whereby to oppose the action of the amplifier thus tending to produce a torque on the transducer opposing its motion. Since the emf induced in the feedback coil is proportional to the relative velocity of the motor and stator of the transducer, the restoring torque is also proportional to the velocity and thus active feedback viscous damping is effected.

A feature of our invention is damping means included as an integral portion of the transducer and effective to stabilize the movement thereof.

Another feature of our invention is a differential amplifier for driving a transducer and damping means for reversing the effect of the amplifier whereby to stabilize the action of the transducer.

In a second embodiment of the invention, the above advantages are obtained with a single drive coil.

BRIEF DESCRIPTION OF THE DRAWING

A full understanding of the arrangement contemplated by the present invention as well as an appreciation of the various advantageous features thereof may be gained from consideration of the following detailed description in connection with the accompanying drawing in which.

DESCRIPTION OF A PREFERRED EMBODIMENT

Figure 1:
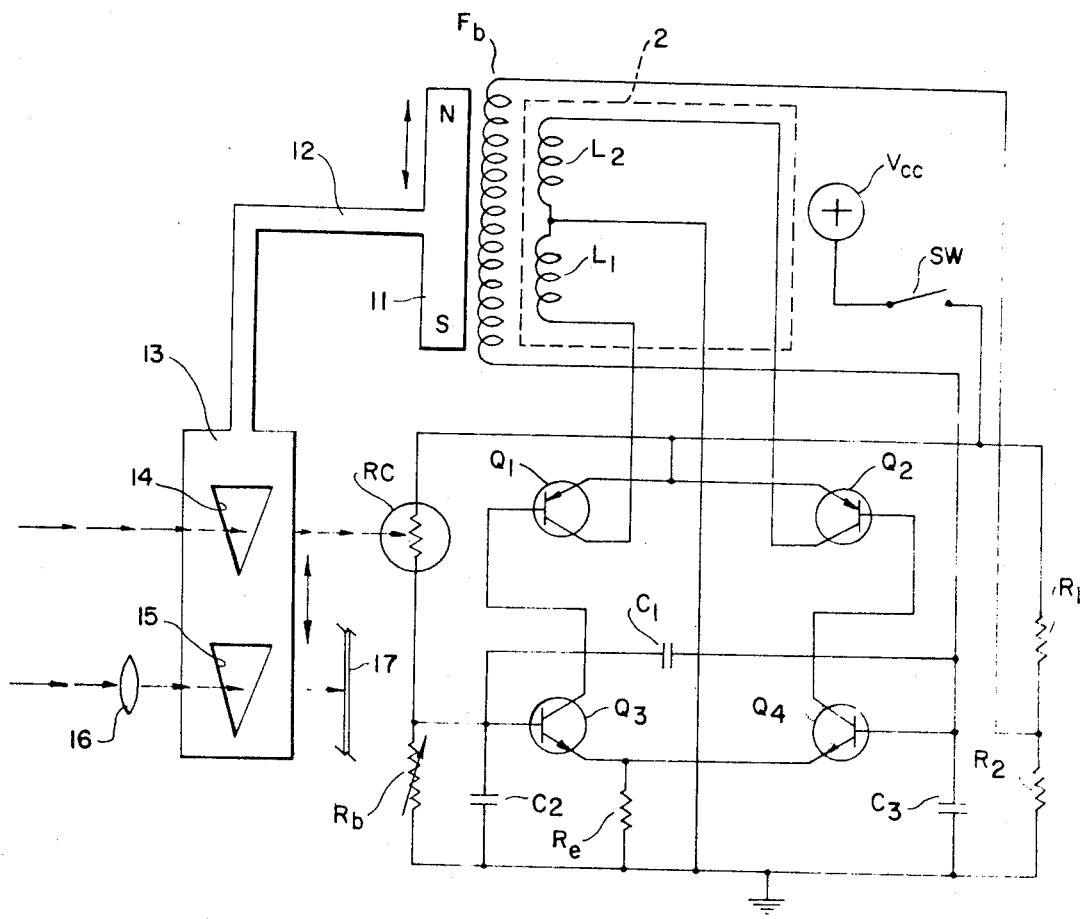
FIG. 1 shows schematically the general arrangement of an automatic exposure control circuit as contemplated by a specific illustrative embodiment of the invention.

Referring now to the drawing an automatic exposure control arrangement in accordance with a specific illustrative embodiment of our invention is shown in schematic form.

Four transistors, $Q_1$, $Q_2$, $Q_3$, and $Q_4$ are connected in a general manner well known in the art whereby to constitute a differential amplifier of the so-called complementary type. The amplifier is controlled by a resistance bridge circuit which includes resistors $R_1$, $R_2$, $R_b$, and RC; resistor $R_b$ is preferably variable in order to facilitate initial balance of the amplifier circuit while resistor RC is a photoelectric device the effective resistance of which varies in accordance with the illumination thereof. When switch SW is closed, positive potential from source $V_{cc}$ is connected to one side of the circuit while the opposite side is connected to ground potential as shown.

The arrangement and operation of this general type of amplifier are well understood in the art and will not be described in detail herein. However, it might be pointed out that when transistor $Q_3$ is turned ON by connection of positive forward bias to the base thereof through resistor RC, transistor $Q_1$ is then turned ON by connection of negative forward bias to its base via the emitter-collector path of transistor $Q_3$ and resistor RC. Similarly, when transistor $Q_4$ is turned ON by an application of positive bias to its base this is followed by transistor $Q_2$ being turned ON by negative bias applied to its base via the emitter-collector path of transistor $Q_4$. When transistor $Q_1$ is ON energizing current is supplied to drive coil $L_1$ of the transducer via the emitter-collector path of transistor $Q_1$ and, similarly, when transistor $Q_2$ is ON, energizing current is supplied to the oppositely poled drive coil $L_2$ via the emitter-collector path of transistor $Q_2$.

In order to avoid unnecessary complication of the drawing, the transducer and light controlling member are shown in schematic form only; the movement of permanent magnet 11 in respectively opposite directions (as indicated by the double-ended arrow) is controlled by oppositely poled drive coils $L_1$ and $L_2$. A feedback coil $F_b$ is also provided at the transducer for an important and novel purpose as will be described subsequently.

The magnet 11 is mechanically coupled by shaft 12 to light controlling means shown here as aperture plate 13 (AP) whereby movement of magnet 11 causes corresponding movement of plate 13. The aperture plate 13 is provided with light apertures 14 and 15 of correspondingly tapered contour; aperture 14 controls by its adjusted position the amount of scene or ambient light supplied to resistor RC while aperture 15 in a similar manner controls the amount of light supplied via lens 16 to a photosensitive surface such as camera film 17.

Considering now the operation of the circuit and assuming first that the amount of light reaching resistor RC is such that the ratio of the resistance values $RC/R_b$ is equal to the ratio of resistance values $R_1/R_2$, then the amplifier will be balanced, equal currents will pass through drive coils $L_1$ and $L_2$, and there will be no net force tending to move the transducer. (This is the condition prevailing when the amount of light being supplied to photocell RC and therefore to film 17, is of the ideal magnitude for best photographic results. Variable resistor $R_b$ may be previously adjusted to assure bridge balance at the desired illumination value.)

Assuming now, however, that the ambient light drops below the previous level with a consequent reduction in illumination of photosensitive device RC. The ratio of resistance values $RC/R_b$ is now greater than that of $R_1/R_2$ and the amplifier functions to supply additional energizing current to drive coil $L_1$; this is effective, in turn, to cause movement of magnet 11 and aperture plate 13 in a "down" direction. This downward movement of aperture plate 13 is effective to "open" apertures 14 and 15 whereby to increase the amount of light supplied to photocell RC and film 17.

Conversely, under conditions when the amount of light reaching photocell RC and film 17 is greater than the previously established ideal magnitude for good quality pictures, the ratio of resistance values $RC/R_b$ will then be less than the ratio of resistance values $R_1/R_2$ and the amplifier will then function to supply additional energizing current to drive coil $L_2$ whereby to move magnet 11 and aperture plate 13 in an "UP" direction. Movement of aperture plate 13 in this direction will be effective to "close" apertures 14 and 15 and to reduce the amount of light reaching photocell RC and the film 17.

Ideally, in the above-described operations, the respective movements of the magnet 11 and plate 13 should be just sufficient to bring about the desired change in the illumination value whereupon the movement should immediately end. In actual practice it has been found, however, that in the apparatus as thus far described, that there is a definite tendency of the device to "overcorrect," that is to overshoot the equilibrium position and continue to oscillate back and forth for several cycles. In accordance with the novel arrangement contemplated by our invention, however, this difficulty is overcome by the provision of an additional coil, the feedback coil $F_b$, on the transducer. This coil is so positioned with respect to the movable permanent magnet 11 that it is in inductive relationship thereto. Thus an *emf* is induced in the feedback coil $F_b$ when the magnet 11 moves with respect to coil $F_b$. As shown in the drawing the feedback coil $F_b$ is so connected in the amplifier circuit that the *emf* induced in the coil is fed into the amplifier circuit in such a direction as to produce a torque on the magnet opposing its motion. Specifically, coil $F_b$ is connected into the amplifier circuit between the base of transistor $Q_4$ and the junction point of resistors $R_1$ and $R_2$ of the bridge. Since the *emf* induced in the coil is proportional to the velocity of the relative motion between the magnet and coil, the restoring torque is also proportional to the velocity, and active feedback viscous damping is effected. Stated in another way, feedback coil $F_b$ senses the rate of motion of the transducer and tends to cause the differential amplifier to reverse whereby to slow down the motion of the transducer.

For instance, when the illumination on photoresistor RC is below the set level, transistors $Q_3$ and $Q_1$ tend to decrease the conductivity while transistors $Q_4$ and $Q_1$ increase their conductivity. This causes an increase in current through coil $L_2$ and a decreasing current through coil $L_1$. The resultant movement of magnet 11 induces a voltage in feedback coil $F_b$ which makes the voltage on the base of transistor $Q_4$ less positive, thus tending to decrease the conductance of transistors $Q_4$ and $Q_2$, and increasing the conductance of transistors $Q_3$ and $Q_1$.

Capacitors $C_1$, $C_2$, and $C_3$ are effective to inhibit high frequency oscillation resulting from interaction between drive coils $L_1$ and $L_2$ and feedback coil $F_b$.

The provision of the feedback coil $F_b$, positioned in inductive relationship to the moving magnet of the transducer and so connected in the amplifier circuit that the induced voltage is fed back into the amplifier in a manner to produce an opposing or damping torque in the transducer magnet, is an effective and efficient step in improving the operation of the automatic exposure control that is by effectively damping the motion of the magnet and preventing overcorrection. The addition of the coil does not in any way reduce the overall efficiency of the device; in particular it does not add in any way to the inertia of the moving system.

It will be understood, of course, that separate aperture plates may be used instead of the single two-aperture plate shown.

It is also to be understood that a variable shutter control can be operated by the transducer instead of the variable diaphragm shown. Of course, the photocell would nevertheless be masked by a variable diaphragm. Also, it will be understood that other types of amplifiers may be used; the general type of amplifier shown, however, is particularly desirable for the purpose since it permits the use of drive coils of relatively low resistance with resulting greater torque. Also, this type of amplifier does not require a constant voltage source since the balance point will not shift if the voltage decreases even though the torque will decrease. This makes it feasible, for example, to power the exposure control from the same batteries that drive the motor of a movie camera. Further, due to the common mode rejection of this type of amplifier, the exposure control circuit is tolerant of a substantial amount of noise in the voltage source as may result, for example, when the drive motor of a movie camera is being operated at the same time as the exposure control.

Figure 2:
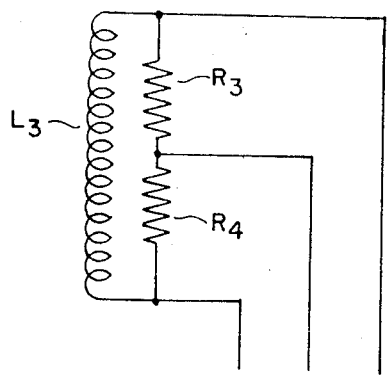
FIG. 2 shows a portion of an alternative embodiment of the invention.

If desired, the invention may be used with a single drive coil $L_3$ connected as shown in FIG. 2. If the arrangement shown in FIG. 2 is substituted for the drive coil arrangement 2 of FIG. 1, no current will pass through coil $L_3$ as long as the voltage drops across resistors $R_3$ and $R_4$ are equal. When the voltage drops become unequal, coil $L_3$ will be energized to the extent of the unbalance and in the direction of the unbalance. Although this arrangement is less efficient than the arrangement of FIG. 1, it enables the use of a simpler transducer having only one coil.

As pointed out above, in the interest of an uncomplicated drawing, the transducer has been shown in a schematic manner only. Actually, the transducer may be any one of several different forms suitable for the purpose. For example, it may comprise a rotatable drum-shaped magnet moving within the drive and feedback coils, or alternatively, may comprise two separate magnets mounted on a common shaft with the drive coils wound around one magnet and the feedback coil wound around the other.

While a specific embodiment of the invention has been selected for detailed disclosure, the invention is not, of course, limited in its application to the embodiment disclosed. The embodiment which has been described should be taken as illustrative rather than restrictive thereof.

The invention has been described in detail with particular reference to a preferred embodiment thereof, but it will be understood that variations and modifications can be effected within the spirit and scope of the invention.

We claim:

1. In a camera having movable exposure varying means, the combination comprising:
   a. first and second oppositely poled coil means magnetically coupled to the exposure varying means and effective for exerting an unbalanced force upon the exposure varying means to move the exposure varying means in a first direction in response to a change in current flow through one of said coil means and in an opposite direction in response to a change in current flow through the other of said coil means;
   b. photosensitive means having an electrical parameter which varies as a function of the level of scene illumination;

c. means coupled to said photosensitive means for varying the current flow through said first and second coil means as a function of said parameter to move the exposure varying means; and d. means magnetically coupling the exposure varying means to said current varying means and responsive to movement of the exposure varying means for opposing the current varying action of said current varying means, whereby movement of the exposure varying means is damped.

2. In a camera, automatic exposure control apparatus for controlling the effective size of a film exposure aperture, comprising:

a. photosensitive means having an electrical parameter which varies as a function of the level of scene illumination;

b. diaphragm means disposed in a cooperative relation with said photosensitive means, said diaphragm means being movable for adjusting the effective size of the aperture;

c. first, second, and third windings magnetically coupled to said diaphragm means, said first and second windings being effective to exert an unbalanced force upon said diaphragm means to move said diaphragm means in a first direction to enlarge the size of the aperture in response to a change in current flow through said first winding and exert an unbalanced force to move said diaphragm means in a second direction to reduce the size of the aperture in response to a change in current flow through said second winding, said third winding being responsive to movement of said diaphragm means to produce a signal; and d. positioning means coupled to said first, second, and third windings and responsive to variations in said parameter from the predetermined value for selectively varying the current through said first and second windings to move said diaphragm means to adjust the size of the aperture to effect a change in said parameter; and e. means coupled to said positioning means and adapted to oppose the current varying action of said positioning means in response to said signal, whereby movement of said diaphragm means is damped.

3. In a camera, automatic exposure control apparatus for controlling the effective size of a film exposure aperture, comprising:

a. photosensitive means having an electrical parameter which varies as a function of the level of scene illumination, a predetermined value of said parameter corresponding to a desired film exposure condition;

b. diaphragm means defining an aperture disposed in a cooperative relation with said photosensitive means, said diaphragm means being movable for adjusting the size of said aperture;

c. first, second, and third windings magnetically coupled to said diaphragm means, said first and second windings being oppositely poled and effective to exert an unbalanced force upon said diaphragm means to move said diaphragm means in a first direction to enlarge the size of said aperture in response to a change in the current through said first winding and exert an unbalanced force effective to move said diaphragm means in a second direction to reduce the size of said aperture in response to a change in the current through said second winding, said third winding being responsive to movement of said diaphragm means to produce a signal;

d. a differential amplifier electrically coupled to said first, second, and third windings and adapted to be responsive to variations in said parameter from the predetermined value to selectively vary the current through said first and second windings to move said diaphragm means to adjust the size of said aperture to effect a change in said parameter to the predetermined value, said differential amplifier being adapted to oppose the current varying action of said differential amplifier in response to said signal, whereby movement of said diaphragm means is damped.

4. In a camera, automatic exposure control apparatus for controlling the effective size of a film exposure aperture, comprising:

a. photosensitive means having an electrical parameter which varies as a function of the level of incident illumination, a predetermined value of said parameter corresponding to a desired film exposure condition;

b. diaphragm means defining an aperture disposed in a cooperative relation with said photosensitive means, said diaphragm means being movable for adjusting the size of said aperture;

c. first, second, and third windings magnetically coupled to said diaphragm means, said first and second windings being oppositely poled and adapted to exert an unbalanced force upon said diaphragm means to move said diaphragm means in a first direction to enlarge the size of said aperture in response to a change in the current through said first winding and exert an unbalanced force to move said diaphragm means in a second direction to reduce the size of said aperture in response to a change in the current through said second winding, said third winding being responsive to movement of said diaphragm means to produce a first signal;

d. a bridge circuit having said photosensitive means in one leg thereof and providing a pair of output terminals and having a balanced condition at said output terminals when said parameter is at the predetermined value and an unbalanced condition wherein a second signal is provided at output terminals when said parameter varies from the predetermined value; and e. a differential amplifier coupled to said output terminals and said first, second, and third windings and said output terminals and adapted to be responsive to said second signal to selectively vary the current through said first and second windings to move said diaphragm means to adjust the size of said aperture to effect the change in said parameter to the predetermined value wherein said bridge circuit is balanced, said differential amplifier being responsive to said first signal to oppose the current varying action of said differential amplifier whereby movement of said diaphragm means is damped.

5. In a camera having a positionable exposure varying means, the combination comprising:

a. photosensitive means having an electrical parameter which varies as a function of the level of incident illumination, a predetermined value of said parameter corresponding to a desired film exposure condition;

b. a transducer including drive coil means and a magnet coupled to the exposure varying means and movable with respect to said drive coil means in respectively opposite directions to position the exposure varying means, said drive coil means having first and second oppositely poled coils effective to exert an unbalanced force upon said magnet to move said magnet as a function of current changes through said first and second windings;

c. positioning means coupled to said first and second windings and responsive to variations in said parameter from the predetermined value for varying the current flow through said first and second windings for moving said magnet to position the exposure varying means; and d. means responsive to movement of said magnet in either of said directions for opposing the action of said positioning means, whereby movement of said magnet is viscously damped.

6. The invention as set forth in claim 4 wherein said positioning means includes a differential amplifier circuit coupled to said first and second windings.

7. The invention as set forth in claim 6 wherein said opposing means includes a third coil magnetically coupling said differential amplifier and adapted upon movement of said magnet to provide an *emf* to said differential amplifier which opposes the current varying action of said differential amplifier.

8. The invention as set forth in claim 7 wherein said differential amplifier includes four transistors each having a base, an emitter, and a collector electrode, a first of said transistors having its output connected to said first coil means input and being controllable by a second of said transistors, a third of said transistors having its output connected to said second coil and being controllable by a fourth of said transistors, a resistance bridge including four resistors connected in series included in said differential amplifier, means for connecting the base of said second transistor to the junction of the first and second of said resistors, and means for connecting said third coil between the base of said fourth transistor and the junction of the third and fourth of said resistors.

* * * * *